United States Patent
True et al.

(10) Patent No.: US 7,420,920 B2
(45) Date of Patent: Sep. 2, 2008

(54) AUTOMATED SERVICE CHANGE RECOMMENDATIONS FOR WIRELESS NETWORK SUBSCRIBERS

(75) Inventors: Sandra Lynn True, St. Charles, IL (US); David S. Benco, Winfield, IL (US); Kevin J. Overend, Elmhurst, IL (US); Baoling S. Sheen, Naperville, IL (US); Kenneth J. Voight, Sugar Grove, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 1078 days.

(21) Appl. No.: 10/712,510

(22) Filed: Nov. 13, 2003

(65) Prior Publication Data

US 2005/0105467 A1   May 19, 2005

(51) Int. Cl.
*H04L 12/16* (2006.01)
*H04M 11/00* (2006.01)

(52) U.S. Cl. .................. 370/235; 370/259; 455/405; 455/406; 455/407; 455/408

(58) Field of Classification Search .............. 455/405, 455/406, 407, 408; 370/235, 259
See application file for complete search history.

(56) References Cited

U.S. PATENT DOCUMENTS

| 6,125,173 | A  | * | 9/2000  | Jagadish et al. | ......... 379/114.1 |
| 6,301,471 | B1 | * | 10/2001 | Dahm et al.     | ............. 455/405 |
| 6,356,628 | B1 |   | 3/2002  | Burke et al.    |                      |
| 6,606,377 | B2 | * | 8/2003  | Ruckart et al.  | ......... 379/121.02 |
| 7,167,699 | B1 | * | 1/2007  | Kretsinger      | ............. 455/405 |
| 7,280,818 | B2 | * | 10/2007 | Clayton         | ............. 455/407 |

* cited by examiner

*Primary Examiner*—Barry W Taylor

(57) ABSTRACT

A method of automatically suggesting service changes for a wireless communications network subscriber is provided. The method includes compiling a record of services used by the subscriber during a time period, determining one or more subscriber usage metrics, comparing the subscriber usage metrics to one or more thresholds, detecting a trigger condition including one or more of the usage metrics exceeding one or more of the thresholds, generating a service change suggestion, and informing the subscriber automatically of the suggested service change using the wireless communications network.

12 Claims, 3 Drawing Sheets

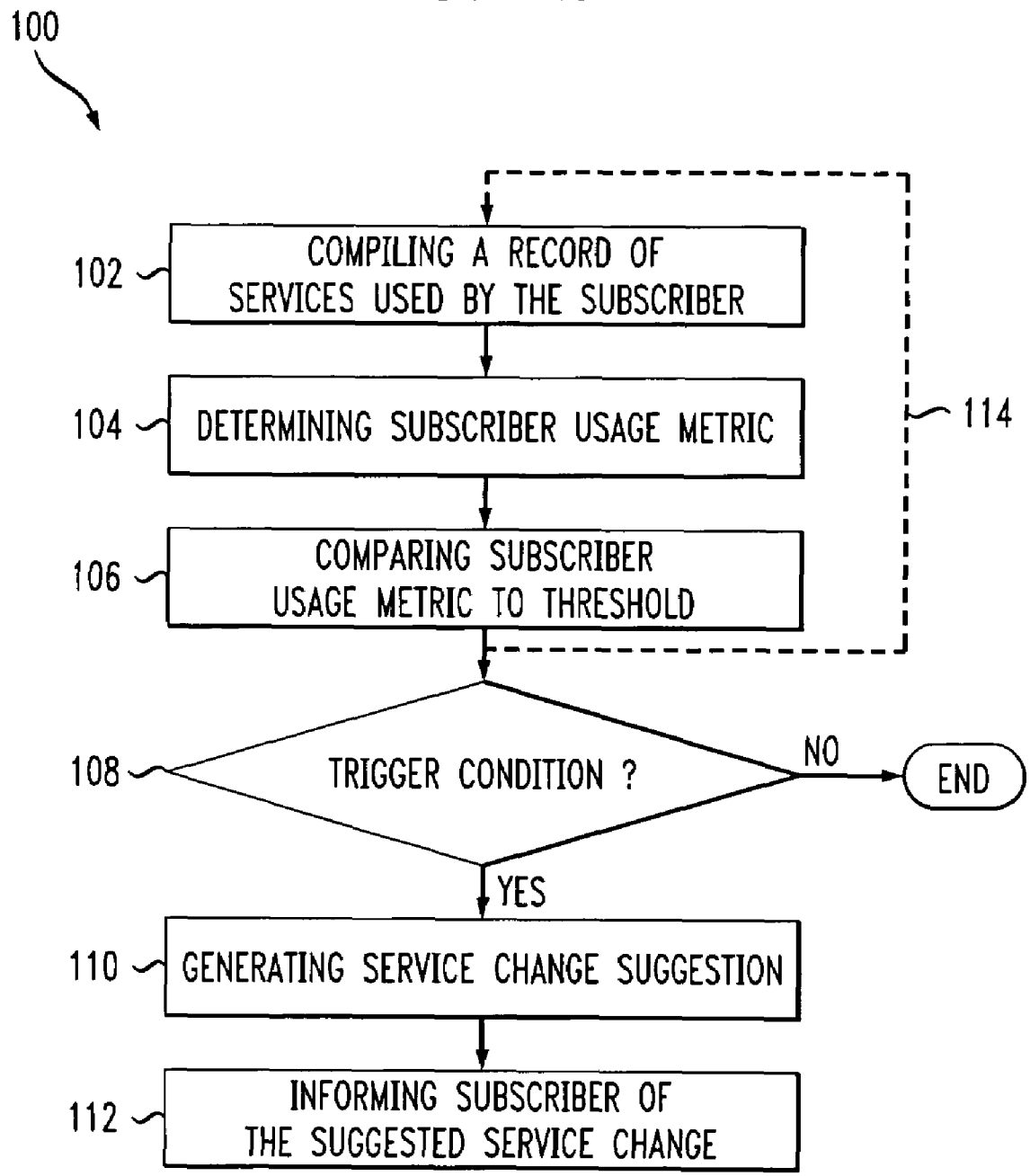

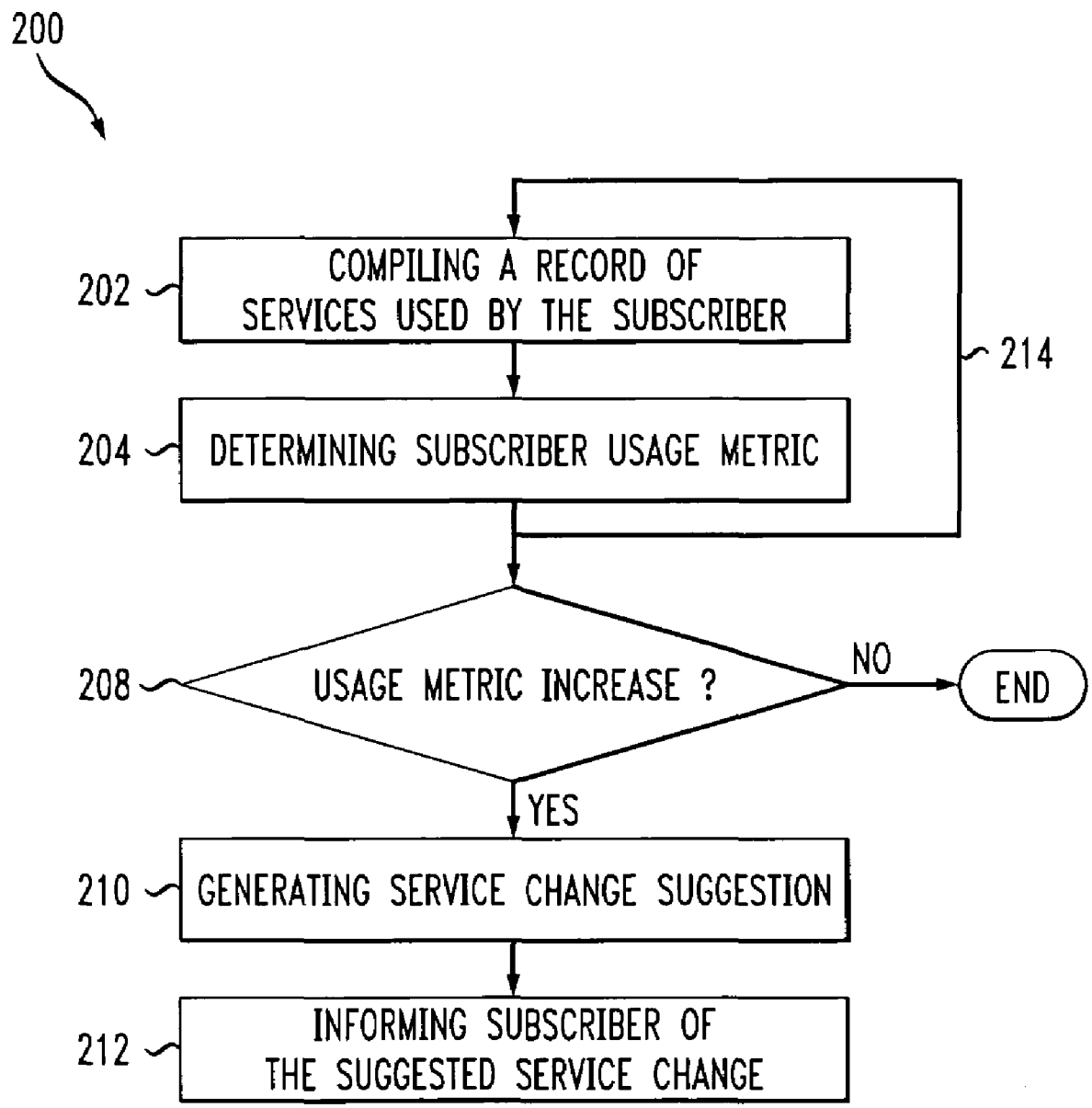

AUTOMATED SERVICE CHANGE RECOMMENDATIONS FOR WIRELESS NETWORK SUBSCRIBERS

BACKGROUND OF THE INVENTION

The present invention relates generally to the art of communications, and, more particularly, to a system and method of automatically suggesting appropriate wireless communications network service changes.

Wireless communications networks, also known as cellular networks, provide a vast array of services for users who are also known as subscribers. Subscribers typically pay a service provider fees for the use of their networks and the services they provide. The service provider typically package their services, with each service package providing a different level of service for a different subscription price. Subscribers can often also get features and/or services added individually for predetermined fees.

A subscriber chooses the service package, also known as a calling plan, they wish to subscribe to and pays the subscription fee each billing cycle. A typical billing cycle can be a month, though any suitable time period can be used. When a subscriber exceeds the service limits allotted by their service package for the billing cycle, they usually must pay more for the extra services they use. Many times a subscriber can accumulate extra charges which exceed the cost of a more expensive package offering even more services. It is desirable to inform the subscriber when a cost effective service package or feature is available that provides the level of services used by the subscriber.

SUMMARY OF THE INVENTION

A method automatically suggesting service changes for a wireless communications network subscriber is provided.

In accordance with a first aspect of the invention, the method includes compiling a record of services used by the subscriber during a time period, determining one or more subscriber usage metrics, comparing the subscriber usage metrics to one or more thresholds, detecting a trigger condition including one or more of the usage metrics exceeding one or more of the thresholds, generating a service change suggestion capable of eliminating the trigger condition, and informing the subscriber automatically of the service change suggestion.

In accordance with a second aspect of the invention, the method includes compiling records of services used by the subscriber during several time periods, determining subscriber usage metrics for the several time periods, comparing the subscriber usage metrics for the several time periods to one or more thresholds, detecting a trigger condition including one or more usage metrics exceeding one or more of the thresholds, generating a service change suggestion, and informing the subscriber automatically of the service change suggestion via the wireless communications network.

BRIEF DESCRIPTION OF THE DRAWINGS

The invention may take form in certain components and structures, preferred embodiments of which will be illustrated in the accompanying drawings wherein:

FIG. 2 is a diagram of a method in accordance with the invention; and

FIG. 3 is a diagram of an alternate embodiment of a method in accordance with the invention.

DETAILED DESCRIPTION OF THE INVENTION

Figure 1:
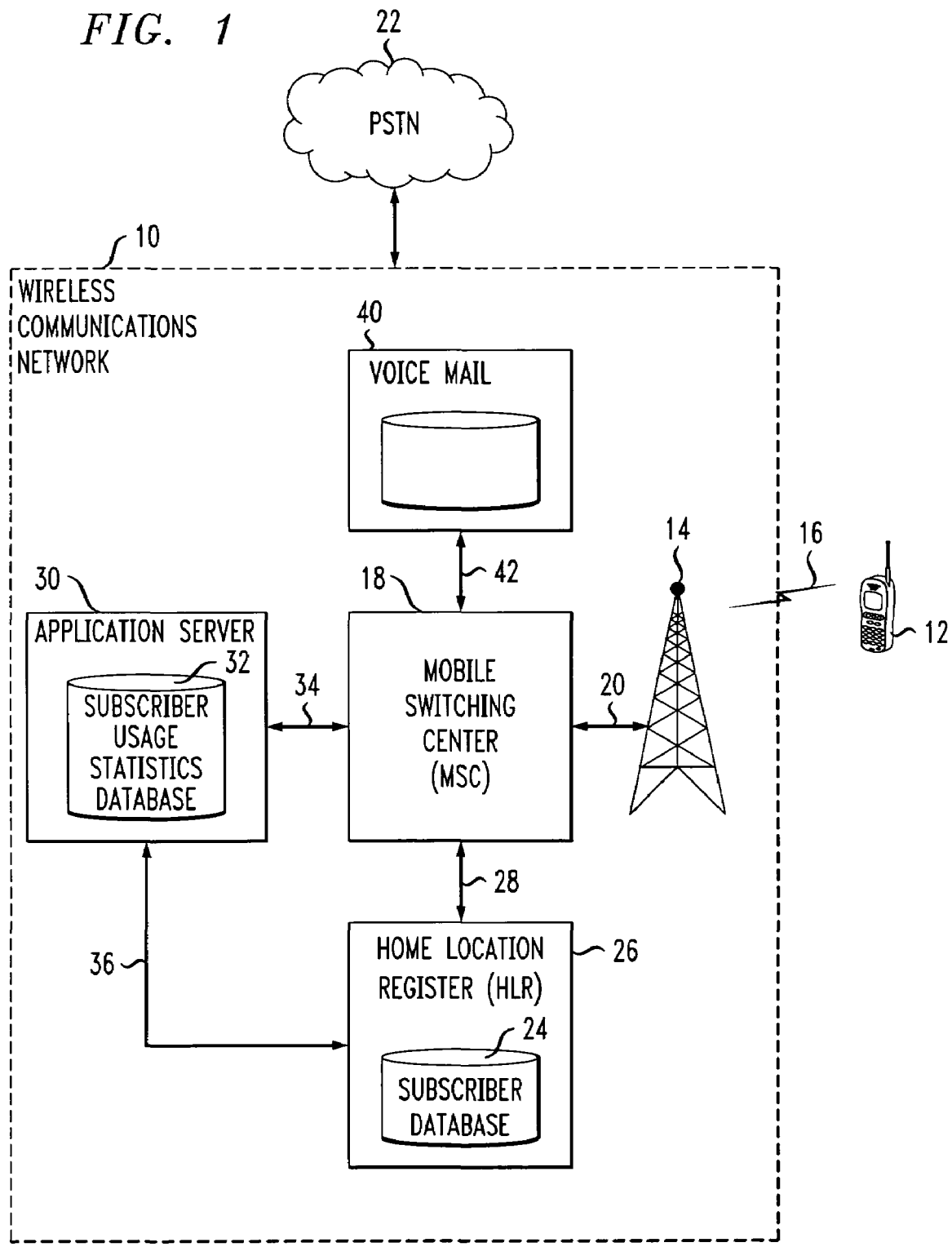
FIG. 1 is a block diagram of a wireless communications network in accordance with the invention.

It is to be understood that the specific methods and systems illustrated in the attached drawings and described in the following specification are simply exemplary embodiments of the inventive concepts defined in the appended claims. Therefore, specific examples and characteristics related to the embodiments disclosed herein are not to be considered as limiting, unless the claims expressly state otherwise.

Referring to FIG. 1, a portion of a wireless communications network is shown generally at 10. The wireless communications network 10 can be any suitable known wireless communications network including but not limited to CDMA, GSM, etc. A wireless communications service provider provides the services of the wireless communications network 10 to subscribers. A subscriber can communicate over the wireless communications network 10 using a wireless communications device 12. The wireless communications device 12, also known as a cellular device, can be capable of sending and/or receiving various media such as data, text, special applications, video, etc., as well as voice communications using the wireless communications network 10. Examples of the wireless communications device 12 can include, but are not limited to, CDMA, GSM, or any other wireless devices capable of using the wireless communications network 10.

The wireless communications network 10 includes a base station 14 communicating with the wireless communications device 12 over an air interface 16. The wireless communications network 10 also includes a Mobile Switching Center (MSC) 18 communicating with the base station 14 using any suitable known connection 20. The MSC 18 handles the communications of the wireless communications device 12 with the communications network 10 including call set-ups, registration and routing incoming calls to the wireless communications device. In the preferred embodiment, the MSC 18 is a processor-based apparatus with data link interfaces for coupling together other portions of the wireless communications network 10 which are not shown. The MSC 18 can be the wireless communications device's home MSC, or it can be a different MSC in the wireless communications network 10 if the wireless communications device 12 is roaming. The wireless communications network 10 is connected to the Public Switched Telephone Network (PSTN) 22 in a known manner to allow communications between the PSTN and the wireless communications device 12.

The wireless communications network 10 also includes a subscriber database 24 of stored subscriber profile information, which includes identification of the services the subscriber subscribes to. The subscriber database 24 can be stored on any suitable node in the wireless communications network 10. By way of example, which should not be considered limiting, the subscriber database 24 can be stored on the Home Location Register (HLR) 26. The HLR 26 is connected to the MSC 18 in a known manner at 28. The HLR 26 can also store information such as user identification, user security information, including network access control information for authentication and authorization, user location information for user registration, etc.

The wireless communications network 10 also includes a processing node, such as for example an Application Server 30. The Application Server 30 determines the one or more subscriber usage metrics, compares the subscriber usage metrics to one or more thresholds, and determines a service change suggestion as described in further detail below. One or more known processing nodes in the wireless communications network 10 can be used to perform these tasks. The Application Server 30 is connected to the MSC 18 using any suitable known connection at 34. The Application Server 30 is connected to the HLR 26 using any suitable known connection at 36.

The Application Server 30 contains a Subscriber Usage Statistics Database 32 which is used to collect the subscriber usage metrics from the record of services used by the subscriber for the billing cycle. The compiled record of services used is stored on the network, such as for example, in the subscriber profile database 24 or in a billing database (not shown).

The wireless communications network 10 also includes a voicemail system 40 connected to the MSC 18 in a known manner at 42. The voicemail system 40 stores voicemail messages intended for the subscriber. The subscriber can access the voicemail messages via the wireless network 10 in a known manner.

Referring now to FIG. 2, a flowchart illustrating a method for automatically suggesting a service change in accordance with the invention is shown generally at 100. The invention develops a subscriber's usage pattern over one or more time periods and suggests service changes which would benefit the subscriber. The invention can operate on a per subscriber basis tracking the usage for each subscriber and suggesting cost effective service changes tailored to each individual subscriber's usage patterns. FIG. 2 is described below with reference to the preferred embodiment of FIG. 1.

The method 100 includes compiling a record of services used by the subscriber during a time period at 102. For the examples provided herein, which should not be considered as limiting, the time period is a billing cycle. The billing cycle can be a month, though other suitable time periods can-be used.

Wireless communications service providers typically keep a record of the services used by the subscriber during the billing cycle for billing purposes. The record can be compiled on a database, such as the subscriber database 24, stored on a node in the wireless communications network, such as the HLR 26. Examples of services used by the subscriber for which records are compiled can include, but are not limited to, minutes of voice communications used by the subscriber and the amount of data the subscriber transmits over the wireless communications system during the billing cycle.

The method 100 also includes determining one or more subscriber usage metrics at 104. Usage metrics are measures of the services used by the subscriber during the billing cycle. The subscriber usage metrics are determined by the Application Server 30 from the service record compiled at 102 and can be stored in the subscriber Usage Statistics Database 32 or on any suitable processing node in the network 10.

Examples of the usage metrics can include, but are not limited to, total minutes of voice communications used during the billing cycle, minutes of voice communication used during peak hours during the billing cycle, minutes of voice communication used during off-peak hours during the billing cycle. Other examples of usage metrics for the subscriber can include, but are not limited to, the total amount of data transmitted over the wireless communications network during the billing cycle, the amount of data transmitted during peak hours and off-peak hours during the billing cycle and the number of SMS messages sent and/or received by the subscriber.

The method 100 can also include comparing the one or more subscriber usage metrics to one or more thresholds at 106. Examples of the thresholds are provided below. The method 100 also includes detecting a trigger condition at 108. The trigger condition can be generated when a usage metric exceeds a corresponding threshold as shall be described in further detail below. The trigger condition can also be generated by an increase in the usage metrics over several time periods as described in further detail below.

The method also includes generating a service change suggestion at 110. The suggested service change can be a service package upgrade having higher usage allotments, or an added feature. The suggested service change can be capable of eliminating the trigger condition detected at step 108 as described below.

The method also includes informing the subscriber of the service change suggestion via the wireless communications network at 112. The subscriber can be informed of the suggested service change at 112 by the Application Server, or any other suitable node, automatically generating a Short Message Service message, referred to herein as an SMS message, describing the suggested service change. The SMS message can be sent from the node, such as the Application Server 30 to the MSC 18 to the subscriber's wireless terminal 12 via the wireless communications network 10 in any suitable known manner.

The subscriber can also be informed by voicemail. The Application Server 30 can automatically generate a voicemail message describing the suggested service change and sending the voicemail message to the voicemail system 40. The subscriber can then access the voicemail message in any suitable known manner.

In one embodiment, the invention can determine when a subscriber has exceeded one or more of their usage allotments during a billing cycle resulting in an overage and suggest a service change which will eliminate this overage. A subscriber's usage allotment can be defined as an amount of service allotted to the subscriber by the subscriber's service package for a billing cycle. Typically, the subscriber must pay a premium for the services they use that exceed their usage allotment during a billing cycle. By upgrading to the suggested service change, the subscriber can avoid paying the premium and save money. In this embodiment, the trigger condition is generated, and thus detected, when the usage metric exceeds the usage allotment.

For example, a subscriber subscribing to service package A may be allotted 100 total minutes of voice communications over the network 10 during the month. The subscriber is typically charged extra for each minute, or portion of a minute, of voice communications used after exceeding 100 minutes during the month. Therefore, 100 total minutes of voice communications is a usage allotment for this subscriber.

In accordance with this example, the method also includes comparing the subscriber's usage metric of "total minutes of voice communications used" with the corresponding usage allotment "total minutes of voice communications allotted" at 106. The comparison can be made by the Application Server 30. The trigger condition is generated/detected at 108 when the usage metric of 120 voice minutes used exceeds the usage allotment of 100 voice minutes allotted.

The embodiment also includes generating a service change suggestion capable of eliminating the overage pattern at 110. The service change can include changing to a different service package. For example, it can be determined that service package B provides a service allotment of 200 total voice minutes which is large enough to eliminate the overage trigger condition.

The network informs the subscriber of the service change suggestion at 112 by automatically generating a message describing the suggested service change and sending the message to the subscriber as described above.

Other usage allotments can include, but are not limited to, the number voice minutes used during peak periods, the number of voice minutes used during off-peak periods, the total amount of data the subscriber transfers over the network, the number of separate data transmissions transferred over the network, or any other suitable limits allotted by the service provider in the subscriber's service package.

The method 100 can also determine a trend from the subscriber's usage patterns over several time periods, such as several billing cycles, and suggest a service change which could benefit the subscriber. The method can include compiling the subscriber usage pattern for the several time periods, by repeating steps 102, 104 and 106 for each time period as shown by the dotted line 114. The trigger condition generated/detected at 108 includes the trend of the one or more usage metrics exceeding the one or more thresholds for a plurality of the time periods.

For example, if a subscriber's usage metric "peak-time voice minutes used" exceeds their threshold "peak-time voice minutes allotted" for a predetermined number of the several billing cycles the trigger condition is generated. A service change suggestion is determined at 110 and the subscriber is informed at 112 as described above. By determining a usage metric increase over several time periods, the method 100 can more accurately determine suggested service changes which could benefit the subscriber.

The invention can also suggest a service change which includes adding a feature provided by the service provider which the subscriber does not currently subscribe to. In this embodiment, the Application Server 30 can be programmed to use a new feature threshold for the threshold used in step 106. The new feature threshold can be chosen to be any event or number of events which, when exceeded by the corresponding subscriber usage metric will generate the trigger condition at 108 leading to the generation of the service change suggestion at 110 that the subscriber add the feature. The subscriber is informed using the wireless communications network at step 112 in a manner as described above.

As an example, the new feature threshold can be a predetermined number of times that the subscriber who does not have call waiting receives an incoming call while they are already on the line. The usage metric would be the number of times that the subscriber who does not have call waiting receives an incoming call while they are already on the line and the new feature threshold would be a predetermined number of time this occurs, such as 3, though any suitable number can be used. If the subscriber receives 4 incoming calls while already on the line during the time period the new feature threshold would be exceeded at 106 and the trigger condition would be detected at 108. The suggested service change would be the new feature, call waiting determined at 110. The subscriber would be informed of the suggested service change at 112.

The method 100 can also determine that a new feature would benefit the subscriber from the subscriber's usage patterns acquired over several time periods, such as billing cycles. In this manner, the method can include compiling the subscriber usage pattern for the several time periods, by repeating steps 102, 104 and 106 for each time period as shown by the dotted line 114 as described above. The new feature threshold can similar as described above for step 106. The trigger condition generated/detected at 108 includes the trend of the one or more usage metrics exceeding the one or more new feature thresholds for a plurality of the time periods. The service change suggestion generated at 110 is similar to that described above and the subscriber is informed using the wireless communications network at step 112 in a similar manner as described above.

Referring now to FIG. 3, an embodiment is shown generally at 200 wherein an increase in one or more subscriber usage metrics over several time periods would indicate a trend which could be used to suggest a service change. The method 200 includes compiling the record of services used by the subscriber at 202, and determining one or more subscriber usage metrics at 204 in a similar manner as described above. The one or more subscriber usage metrics are tracked over several time periods, such as billing cycles by repeating steps 202 and 204 as shown by line 214.

The trigger condition for this embodiment is a predetermined increase in the usage metric over the time periods as shown at step 208. The predetermined amount of increase of the usage metric can be chosen by the service provider, such as a 10%, though any suitable increase can be used. If there is a predetermined increase in the subscriber usage metric at 208, the trigger condition is generated causing a service change suggestion to be generated at 210. The suggested service change can be a service package upgrade or the addition of a new feature. The method also includes informing the subscriber of the service change suggestion at 212 in a manner as described above.

It is to be appreciated that in connection with the particular exemplary embodiments presented herein certain structural and/or function features are described as being incorporated in and/or with defined elements and/or components. However, it is contemplated that these features may, to the same or similar benefit, also likewise be incorporated in and/or with other elements and/or components and/or in other various embodiments where appropriate. It is also to be appreciated that different aspects of exemplary embodiments may be selectively mixed and matched as appropriate to achieve other alternate embodiments suited for desired applications, the other alternate embodiments thereby realizing the respective advantages of the aspects incorporated therein.

It is also to be appreciated that particular elements or components described herein may have their functionality suitably implemented via hardware, software, firmware or a combination thereof. Additionally, it is to be appreciated that certain elements described herein as incorporated together may under suitable circumstances be stand alone elements or otherwise divided. Similarly, a plurality of particular functions described as being carried out by one particular element may be carried out by a plurality of distinct elements acting independently to carry out individual functions, or certain individual functions may be split-up and carried out by a plurality of distinct elements acting in concert. Alternately, some elements or components otherwise described and/or shown herein as distinct from one another may be physically or functionally combined where appropriate.

The invention has been described with reference to preferred embodiments. Obviously, modifications and alterations will occur to others upon reading and understanding the present specification. It is intended that the invention be construed as including all such modifications and alterations insofar as they come within the scope of the appended claims or the equivalents thereof.

We claim:

1. A method for a wireless communications network to automatically suggest subscriber service changes comprising:

compiling a record of services used by the subscriber during a time period;

determining a subscriber usage metric for the time period;

comparing the subscriber usage metric to a threshold, the threshold being a new feature threshold;

detecting a trigger condition including the subscriber usage metric exceeding the threshold;

generating a service change suggestion capable of eliminating the trigger condition, wherein the service change is a new feature not subscribed to by the subscriber; and informing the subscriber of the service change suggestion via the wireless communications network.

2. The method defined in claim 1 further comprising repeating the step of compiling a record of services, the step of determining a subscriber usage metric and the step of comparing the subscriber usage metric to a threshold for several time periods, wherein the trigger condition includes a trend of the usage metric exceeding the threshold for a plurality of the time periods.

3. The method defined in claim 1 further comprising repeating the step of compiling a record of services, the step of determining a subscriber usage metric and the step of comparing the subscriber usage metric to a threshold for several time periods, wherein the trigger condition includes the usage metric exceeding the new feature threshold for a plurality of the time periods.

4. The method defined in claim 1 wherein the informing step comprises:

generating an SMS message informing of the service change suggestion; and sending the SMS message to the subscriber via the wireless communications network.

5. The method defined in claim 1 wherein the informing step comprises:

sending an automated voicemail message to the subscriber via the wireless communications network.

6. The method defined in claim 1 wherein the time period is a billing cycle.

7. The method defined in claim 1 wherein the time period is a month.

8. A method for a wireless communications network to automatically suggest subscriber service changes comprising:

compiling a record of services used by the subscriber during a time period;

determining a subscriber usage metric for the time period, wherein the subscriber usage metric includes the number incoming calls received by the subscriber while the subscriber is already using the phone;

comparing the subscriber usage metric to a threshold, the threshold being a new feature threshold;

detecting a trigger condition including the subscriber usage metric exceeding the threshold;

generating a service change suggestion capable of eliminating the trigger condition, wherein the service change is a new feature not subscribed to by the subscriber; and informing the subscriber of the service change suggestion via the wireless communications network.

9. A system for a wireless communications network to automatically suggest subscriber service changes comprising:

one or more processing nodes in the wireless network for determining a subscriber usage metric for a time period, comparing the subscriber usage metric to a new feature threshold, detecting a trigger condition including the subscriber usage metric exceeding the new feature threshold, generating a service change suggestion capable of eliminating the trigger condition having a new feature not subscribed to by the subscriber, and informing the subscriber of the service change suggestion via the wireless communications network.

10. The system defined in claim 9 further comprising:

a Mobile Switching Center (MSC) connected to the one or more processing nodes for informing the subscriber of the service change suggestion via the wireless communications network.

11. The system defined in claim 10 wherein the MSC informs the subscriber of the service change suggestion via a Short Message Service message.

12. The system defined in claim 10 further comprising:

a voicemail system in the wireless network connected to the MSC for informing the subscriber of the service change suggestion.

* * * * *